United States Patent
Takasu

(10) Patent No.: US 10,521,783 B2
(45) Date of Patent: Dec. 31, 2019

(54) POS TERMINAL, POS SYSTEM, AND CONTROL METHOD OF A POS TERMINAL

(71) Applicant: Seiko Epson Corporation, Tokyo (JP)

(72) Inventor: Kazuhiro Takasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 371 days.

(21) Appl. No.: 15/115,755

(22) PCT Filed: Mar. 31, 2015

(86) PCT No.: PCT/JP2015/001851
§ 371 (c)(1),
(2) Date: Aug. 1, 2016

(87) PCT Pub. No.: WO2015/151510
PCT Pub. Date: Oct. 8, 2015

(65) Prior Publication Data
US 2017/0011375 A1    Jan. 12, 2017

(30) Foreign Application Priority Data

Apr. 4, 2014  (JP) ................. 2014-077682
Apr. 8, 2014  (JP) ................. 2014-079192

(51) Int. Cl.
*G06Q 20/20* (2012.01)
*G07G 1/12* (2006.01)
(Continued)

(52) U.S. Cl.
CPC ........... *G06Q 20/202* (2013.01); *G06Q 20/22* (2013.01); *G07G 1/12* (2013.01)

(58) Field of Classification Search
CPC ...... G06Q 20/202; G06Q 20/22; G06Q 30/06; G07G 1/12
See application file for complete search history.

(56) References Cited

U.S. PATENT DOCUMENTS 7,225,155 B1 * 5/2007 Polk .................. G06Q 10/10
705/35
7,440,775 B2 * 10/2008 Lee ..................... H04L 12/2812
455/426.2

(Continued)

FOREIGN PATENT DOCUMENTS

JP    2000-148851 A    5/2000
JP    2005-346720 A    12/2005
(Continued)

*Primary Examiner* — Fahd A Obeid
*Assistant Examiner* — Michael Jared Walker
(74) *Attorney, Agent, or Firm* — Workman Nydegger

(57) ABSTRACT

A POS terminal, a POS system, and a control method of a POS terminal enable adding or changing a payment function, including an electronic payment function, at low cost. A tablet terminal according to the invention has a first operating unit that is located at a first address and runs a first payment application to execute a payment process; a second operating unit that is located at a second address and runs a second payment application; a third operating unit that runs a POS application to execute a transaction process; a storage unit that stores the first address and the second address; and a communication unit that sends the transaction process result of the POS application run by the third operating unit to the first address or the second address.

9 Claims, 10 Drawing Sheets

(51) Int. Cl.
*G06Q 20/00* (2012.01)
*G06Q 20/22* (2012.01)

(56) References Cited

U.S. PATENT DOCUMENTS

| | | | | |
|---|---|---|---|---|
| 7,499,875 B1* | 3/2009 | May | G06Q 20/08 | 705/26.3 |
| 7,680,737 B2* | 3/2010 | Smith, Jr. | G06Q 20/105 | 379/112.06 |
| 8,276,069 B2* | 9/2012 | Chen | H04L 12/2809 | 715/700 |
| 8,612,634 B2* | 12/2013 | Kweon | H04L 12/282 | 710/5 |
| 8,818,894 B2* | 8/2014 | Li | G06Q 20/32 | 705/40 |
| 2002/0156683 A1* | 10/2002 | Stoutenburg | G06Q 20/04 | 705/16 |
| 2003/0222135 A1* | 12/2003 | Stoutenburg | G06Q 20/04 | 235/379 |
| 2004/0159699 A1* | 8/2004 | Nelson | G06Q 20/20 | 235/379 |
| 2006/0116957 A1* | 6/2006 | May | G06Q 20/02 | 705/40 |
| 2008/0147552 A1* | 6/2008 | Morsillo | G06Q 20/102 | 705/44 |
| 2009/0024471 A1* | 1/2009 | Nielson | G06Q 20/10 | 705/14.54 |
| 2009/0265252 A1* | 10/2009 | Fletcher | G06Q 30/04 | 705/26.1 |
| 2010/0205062 A1* | 8/2010 | Glatt | G06Q 20/102 | 705/17 |
| 2011/0167002 A1* | 7/2011 | Balasubramanian | G06Q 20/04 | 705/44 |
| 2012/0095787 A1* | 4/2012 | Davis | G06Q 40/08 | 705/4 |
| 2012/0095918 A1* | 4/2012 | Jurss | G06Q 20/40 | 705/44 |
| 2013/0054391 A1* | 2/2013 | Hipolito | G06Q 20/20 | 705/17 |
| 2013/0073309 A1* | 3/2013 | Ritchie | G06Q 20/02 | 705/2 |
| 2013/0166628 A1* | 6/2013 | Theado | G06Q 20/20 | 709/203 |
| 2013/0339165 A1* | 12/2013 | Calman | G06Q 30/06 | 705/16 |
| 2014/0006193 A1* | 1/2014 | Holt | G06Q 20/20 | 705/20 |
| 2014/0019276 A1* | 1/2014 | Rifaat | G06Q 20/045 | 705/21 |
| 2014/0019365 A1* | 1/2014 | Fallows | G06Q 20/202 | 705/71 |
| 2014/0025513 A1* | 1/2014 | Cooke | G06O 20/3278 | 705/17 |
| 2014/0040001 A1* | 2/2014 | Harvey | G06Q 10/00 | 705/14.26 |
| 2014/0040145 A1* | 2/2014 | Ozvat | G06Q 20/401 | 705/64 |
| 2014/0040148 A1* | 2/2014 | Ozvat | G06Q 20/3829 | 705/71 |
| 2014/0052586 A1* | 2/2014 | Weber | G06Q 30/0637 | 705/26.82 |
| 2014/0058866 A1* | 2/2014 | Okadome | G06Q 20/202 | 705/21 |
| 2014/0089120 A1* | 3/2014 | Desai | G06Q 20/322 | 705/21 |
| 2015/0002896 A1* | 1/2015 | Takasu | G06F 3/1209 | 358/1.15 |
| 2015/0170125 A1* | 6/2015 | Takamoto | G06F 9/455 | 705/16 |

FOREIGN PATENT DOCUMENTS

| | | |
|---|---|---|
| JP | 2008-015616 A | 1/2008 |
| JP | 2009-140035 A | 6/2009 |
| JP | 2009-176065 A | 8/2009 |
| JP | 2010-176227 A | 8/2010 |
| JP | 2010-272048 A | 12/2010 |
| JP | 2011-113565 A | 6/2011 |
| JP | 2012-181711 A | 9/2012 |
| JP | 2012-529699 A | 11/2012 |
| JP | 2013-186488 A | 9/2013 |

* cited by examiner

POS TERMINAL, POS SYSTEM, AND CONTROL METHOD OF A POS TERMINAL

Priority is claimed under 35 U.S.C. § 119 to Japanese Application Nos. 2014-077682 and 2014-079192 filed on Apr. 4, 2014 and Apr. 8, 2014, respectively, and under 35 U.S.C. § 365 to PCT/JP2015/001851 filed on Mar. 31, 2015.

TECHNICAL FIELD

The present invention relates to a POS (point-of-sale) terminal and to a control method of a POS terminal.

The invention also relates to a data communication system, and a control method of a data communication system, including a terminal that generates POS terminal commands, a control device that connects to a terminal and controls input/output of data, and a device that connects to the control device and receives data input or outputs data.

BACKGROUND

Related technology is described, for example, in PTL 1. A POS system including a tablet terminal functioning as a POS terminal, an input device for reading product barcodes and customer member cards, and a printer connected to the tablet terminal and input device, is disclosed in PTL 1. The tablet terminal is configured to run a POS application through a web browser.

CITATION LIST

Patent Literature

PTL 1 JP-A-2013-186488

SUMMARY

To add an electronic payment function (such as a credit card payment function or electronic money payment function) to the POS system disclosed in PTL 1, an API (application programming interface) for controlling a CAT (credit authorization terminal) and a R/W (reader/writer) must be included in the POS application. More specifically, the backbone POS application must be significantly modified simply to add an electronic payment function, and the cost of adding such a feature balloons. The POS application must also be modified every time a provider of an electronic payment service is added or changed. The POS application may also be replaced to provide a new service, but the POS application is often customized for each customer (each store where the POS system is deployed), and cannot be easily replaced.

In the POS system described in PTL 1, when the above devices are connected to a first printer, a card reader for processing electronic payments (credit card payments, electronic money payments) is connected to a second printer, and an electronic payment transaction is attempted by a terminal connected to the first printer, the connection of the card reader must be switched from the second printer to the first printer. Ideally, all devices, including the card reader, could be connected to the first printer, but because the number of interfaces is limited, functions must be assigned to particular printers.

The first printer and the second printer could conceivably be connected to a network, and commands could be sent from a terminal to the second printer, but this requires modifying the POS application installed on the terminal and the related costs.

The present invention is directed to the foregoing problem, and an objective of the invention is to provide a POS terminal, a POS system, and a control method of a POS terminal enabling adding and changing a payment function, including an electronic payment function, at low cost.

Another objective of the invention is to provide a data communication system, and a control method of a data communication system, enabling one terminal to use a device connected to two or more control devices without requiring greatly changing the POS application.

A POS terminal according to the invention is characterized by having: an operating unit configured to run a POS application that executes a transaction process, and a first application that is located at a first address and executes a first payment process; a storage unit storing the first address; and a transmission unit configured to send a transaction process result of the POS application to the first address.

The above POS terminal, wherein: the operating unit runs a second application that is located at a second address and executes a second payment process different from the first application; the storage unit stores the second address; and the transmission unit sends the transaction process result of the POS application to the first address or the second address.

A control method of a POS terminal, characterized by: running a POS application that executes a transaction process; sending the transaction process result of the POS application to a first address where a first application is located; and the first application executing a first payment process when the transaction process result of the POS application is sent to the first address.

The above control method of a POS terminal, further characterized by: sending the transaction process result of the POS application to a second address where a second application is located; and the second application executing a second payment process when the transaction process result of the POS application is sent to the second address.

Thus comprised, there is no need to greatly modify the POS application in order to add a payment function (such as an electronic payment function) because there is an application for payment processing in addition to a POS application. As a result, a payment function can be added at a low cost. Furthermore, because there are two types of applications as applications for processing payments, and the transaction process result is sent to one of the applications when the transaction process is executed by the POS application, two types of payment processes can be executed. As a result, even when a payment function changes (such as by changing the service provider of the electronic payment service), the storage unit and the application that runs the payment process can be easily changed without greatly modifying the POS application.

Note that the transaction process of the POS application includes acquiring product information, calculating the transaction amount, handling cash payments, payment commands to the first application or second application, and commanding printing a transaction receipt.

In addition, a payment process (first payment process or second payment process) of the first application or second application receives the transaction process result (including the transaction amount) from the POS application, and executes a payment process based on the transaction process result. For example, calculating the remaining point balance and rewriting the point balance if the payment method is paying with reward points.

The number of applications for payment processing is not limited to two applications, and the invention may be configured with three or more applications. In this case, three or more addresses corresponding to the three or more applications are stored in the storage unit.

The above POS terminal, wherein: the first application and the second application execute a payment process related to an electronic payment; the first application sends data to a first electronic payment server; and the second application sends data to a second electronic payment server.

Thus comprised, an electronic payment function can be added or changed at low cost.

Note that a payment process by the first application or second application means sending electronic payment information (including data read by a CAT or reader/writer) to an electronic payment server, and a process (including reporting to the POS application and a retry process) based on the payment execution result of the electronic payment server.

The above POS terminal, further characterized by: a selection unit configured to select the first payment process or the second payment process; the transmission unit sending the payment result of the POS application to the first address or the second address according to the selection result of the selection unit.

Thus comprised, the payment method (first payment process or second payment process) can be selected as desired by the customer.

Note that the payment method may include payment with points and payment by check in addition to electronic payments by credit card or electronic money.

The POS above terminal, wherein: the first payment process executed by the first application is a payment process using a credit card; and the second payment process executed by the second application is a payment process using electronic money.

Thus comprised, a credit card payment function or electronic money payment function can be added or changed (including adding or changing the service provider providing the electronic payment service) at low cost.

A POS system of the invention is characterized by: a POS terminal including an operating unit configured to run a POS application that executes a transaction process, and a first application that is located at a first address and executes a first payment process; a storage unit storing the first address; and a transmission unit configured to send a payment result of the POS application run by the operating unit to the first address; a device configured to read information; a control device that connects to the device and the POS terminal; and a first electronic payment server configured to connect to the control device, and receive data based on the first payment process of the first application through the control device.

The above POS system, wherein: the operating unit runs a second application that is located at a second address and executes a second payment process different from the first application; the storage unit stores the second address; the transmission unit sends the payment result of the POS application run by the operating unit to the first address or the second address; and a second electronic payment server connects to the control device, and receives data based on the second payment process of the second application through the control device.

Thus comprised, there is no need to greatly modify the POS application in order to add an electronic payment function because there is an application other than the POS application for executing a payment process with an electronic payment server, and an electronic payment function can therefore be introduced at low cost. Furthermore, because there are two types of applications as applications for processing payments, the storage unit and the application that runs the payment process can be easily changed without greatly modifying the POS application even when the electronic payment function changes. Furthermore, because a control device intervenes between a device for reading data and the POS terminal, communication is possible even when connecting a device directly to the POS terminal is not possible, such as when a tablet terminal is used as the POS terminal. Furthermore, because a device is connected to the control device, the benefits of tablet terminal portability can be used by connecting the control device and terminal to communicate wirelessly or using a long cable for a wired connection.

A data communication system according to the invention is characterized by including a first control device controlling data input and output; a second control device controlling data input and output; a device that is connected to the second control device and input or outputs data; and a terminal having a command generating unit that generates commands, a setting unit that sets a command destination to the first control device or the second control device, and a communication unit that sends commands to the first control device or second control device based on the destination information set by the setting unit.

A control method of a data communication system according to the invention is characterized by setting and storing the destination of a command to either a first control device or a second control device connected to a device that inputs or outputs data; selecting the first control device or second control device as the destination based on the stored command destination information when a command is generated; and sending the generated command to the selected destination.

Thus comprised, because the destination of a command is set to the first control device or second control device, commands can be sent to the control device appropriate to the content (function) of the command without specifying the destination every time a command is generated. For example, when there is a terminal, a first control device, and a second control device that is connected to a device, and a specific command is generated by the terminal, the command can be sent to the destination previously set for the specific command. As a result, one terminal can use devices connected to two or more control devices (including devices connected to the second control device) without greatly changing the POS application.

In the above data communication system, the first control device preferably has a print unit that prints.

Thus comprised, a printer can be used as the first control device, and the print unit can be operated from the terminal.

Further preferably in the above data communication system, the second control device sends process data resulting from processing data input from a device to the terminal, and the command generating unit of the terminal generates a command based on the process data.

Thus comprised, data from a device connected to a second control device is input to the terminal, and the terminal can use the first control device or a device connected to the first control device based on the data.

Further preferably in the above data communication system, the command generated based on process data is a print command, and the communication unit of the terminal sends the print command to the first control device.

Thus comprised, the terminal can operate the print unit based on data input from a device connected to the second control device.

The invention comprised as described above has an application for payment processing in addition to a POS application, and greatly modifying the POS application is therefore not necessary to add a payment function. As a result, a payment function can be added at a low cost.

DETAILED DESCRIPTION

Embodiment 1

Figure 1:
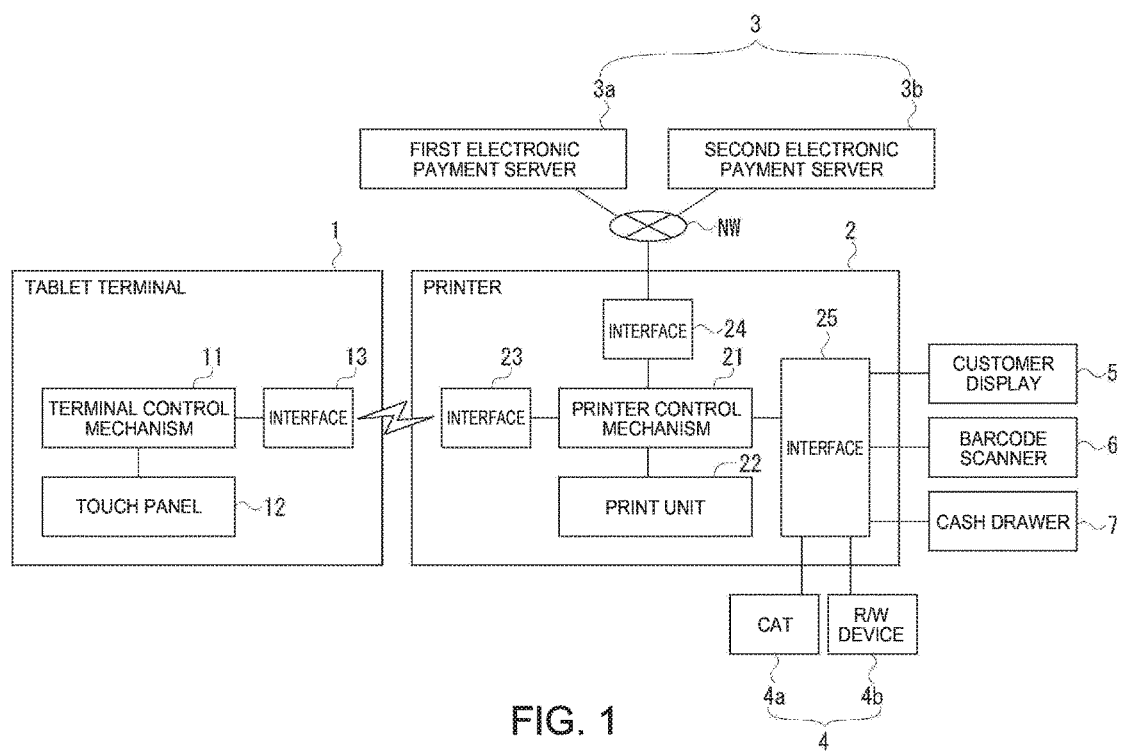
FIG. 1 is a system configuration diagram of a POS system according to a first embodiment of the invention.

A POS terminal, a POS system and a control method of a POS terminal according to the first embodiment of the invention are described below with reference to the accompanying figures. FIG. 1 is a system configuration diagram of a POS system SY1. The POS system. SY1 includes a tablet terminal 1 (POS terminal) that is operated by a store employee; a printer 2 (control device) that connects to the tablet terminal 1 through a wireless communication connection; electronic payment servers 3 (3a, 3b) that connect to the printer 2 through a network NW; and a card reader 4 (device) such as a credit authorization terminal (CAT) 4a or R/W device 4b, a customer display 5, a barcode scanner 6, and a cash drawer 7 that connect to the printer 2. Devices such as the card reader 4, customer display 5, barcode scanner 6, and cash drawer 7 are also generically referred to as peripheral devices.

The tablet terminal 1 includes a terminal control mechanism 11, a touch panel 12, and an interface 13. The terminal control mechanism 11 includes a CPU (Central Processing Unit), ROM (Read Only Memory) and RAM (Random Access Memory), and controls the tablet terminal 1.

The touch panel 12 is a touch sensor with a display function, and is used to display information such as the input product information and payment process result, and perform various operations. The interface 13 is compatible with wireless communication such as a wireless LAN, for example, and sends and receives data through an interface 23 of the printer 2. Note that the tablet terminal 1 and printer 2 may be configured to communicate wirelessly through an access point not shown.

The printer 2 has a printer control mechanism 21, print unit 22, and interfaces 23, 24, and 25. The printer control mechanism 21 includes a CPU, ROM, and RAM, and controls the printer 2. The print unit 22 includes a printhead, paper conveyance mechanism, and paper cutter mechanism, and prints on receipt paper.

The printer 2 communicates wirelessly with the tablet terminal 1 through interface 23, also communicates by wire or wirelessly through interface 25 with peripheral devices 4, 5, 6, 7, and communicates with electronic payment servers 3 over a network NW such as the Internet through interface 24.

Examples of electronic payment servers 3 in this embodiment of the invention include a first electronic payment server 3a for processing credit card payments, and with a second electronic payment server 3b for processing electronic money payments.

Processing an electronic payment by the first electronic payment server 3a includes receiving electronic payment information including the transaction amount and credit information (such as credit card number and expiration date); authenticating the credit card; processing security measures; settling the payment amount; and reporting the payment execution result. Processing an electronic payment by the second electronic payment server 3b includes receiving electronic payment information including the transaction amount and the electronic money information (such as electronic money ID and balance information); electronic money authentication; processing security measures; updating the balance information; and reporting the payment execution result.

The card reader 4 includes a CAT 4a for credit card payments and a R/W device 4b for electronic money payments. The CAT 4a and R/W device 4b read and output data from the credit card or electronic money medium (referred to below as "electronic payment media") to the printer 2. Note that the R/W device 4b is not limited to processing smart-card media, and can also read an electronic money RFID chip embedded in a cell phone, for example.

The customer display 5 displays information such as the product names and transaction amount for the customer. The barcode scanner 6 reads product barcodes printed on or affixed to the products. The cash drawer 7 stores money and checks, for example, and is configured to open when the payment process is completed (when a cash payment is received).

Figure 2:
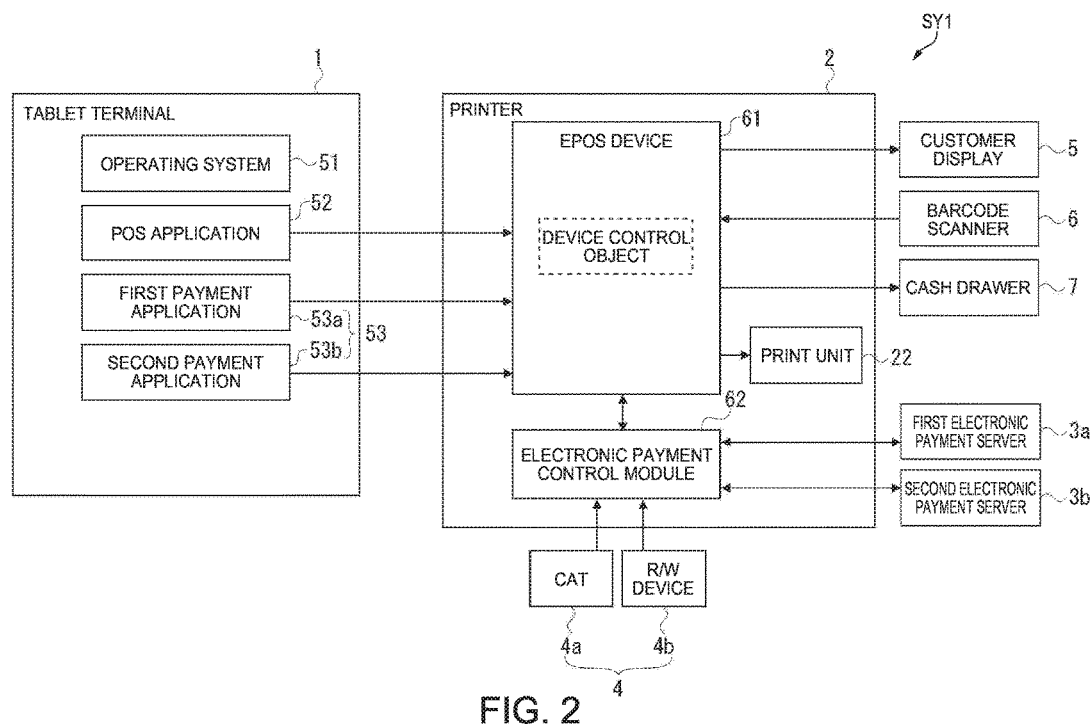
FIG. 2 is a block diagram illustrating the software configuration of a POS system according to the first embodiment of the invention.

The software configuration of the POS system SY1 is described next with reference to FIG. 2. An operating system 51, and a POS application 52 and payment applications 53 (53a, 53b) that run on the operating system 51, are installed as software applications on the tablet terminal 1. The terminal control mechanism 11 in FIG. 1 operates according to these software objects 51, 52, 53.

The POS application 52 is an application that runs a transaction process. A transaction process as used here includes acquiring product information (such as product barcodes and quantities), calculating the payment amount, handling cash payments, sending electronic payment commands to the payment application 53, and controlling printing receipts, for example. The POS application 52 is customized by the store. Such customization may include, for example, the display format of information screens presented on the tablet terminal 1, the printing format of transaction receipts, the store logo printed on transaction receipts, and the display items presented on the customer display 5.

The payment applications 53 include a first payment application 53a (first application) for running a credit card payment process (first payment process), and a second payment application 53b (second application) for running an electronic money payment process (second payment process). The payment process includes controlling sending electronic payment information to the electronic payment server 3, and processes based on the payment execution result from the electronic payment server 3 (including reporting to the POS application 52 and retry processes). The payment application 53 is not customized for each store, and may be used generically.

The printer 2 has an embedded ePOS device 61 and electronic payment control module 62. Operation of the printer control mechanism 21 in FIG. 1 is based on the ePOS device 61 and electronic payment control module 62.

Based on commands from the POS application 52 and payment application 53, the ePOS device 61 instantiates device control objects for and controls the peripheral devices 4, 5, 6, 7 and print unit 22. For example, the ePOS device 61 controls displaying product names on the customer display 5 based on display commands from the POS application 52, controls sending the results of reading by the barcode scanner 6 to the operating system 51, controls opening the drawer of the cash drawer 7 based on an open drawer command from the POS application 52, and controls operating the print unit 22 based on a print command from the POS application 52. In addition, when a start payment process command is received from the payment application 53, the ePOS device 61 sends the command to the electronic payment control module 62.

The electronic payment control module 62 is an embedded module for controlling the card reader 4 (CAT 4a, R/W device 4b). For example, when a start payment process command is passed from the ePOS device 61, the electronic payment control module 62 enables reading by the card reader 4 and waits for data from the card reader 4. The electronic payment control module 62 is also compatible with multiple different brands of electronic payment media.

The electronic payment control module 62 also controls communicating with the electronic payment server 3 (first electronic payment server 3a, second electronic payment server 3b). More specifically, the electronic payment control module 62 sends electronic payment information including the data captured by the card reader 4 and the payment amount received from the payment application 53 to the electronic payment server 3. When payment is successfully completed by the electronic payment server 3, the electronic payment control module 62 may also control turning an LED (not shown in the figure) on the card reader 4 on to signal that the card may be removed, and sending a payment completion report through the ePOS device 61 to the payment application 53.

When the electronic payment server 3 is unable to successfully complete the payment, the electronic payment control module 62 may control an LED on the card reader 4 to blink, or control the payment application 53 to display an error (on the touch panel 12) through the ePOS device 61. By thus embedding an electronic payment control module 62, an electronic payment service may be added or changed by simply replacing the electronic payment control module 62 (without needing to replace the printer 2 itself).

Figure 3:
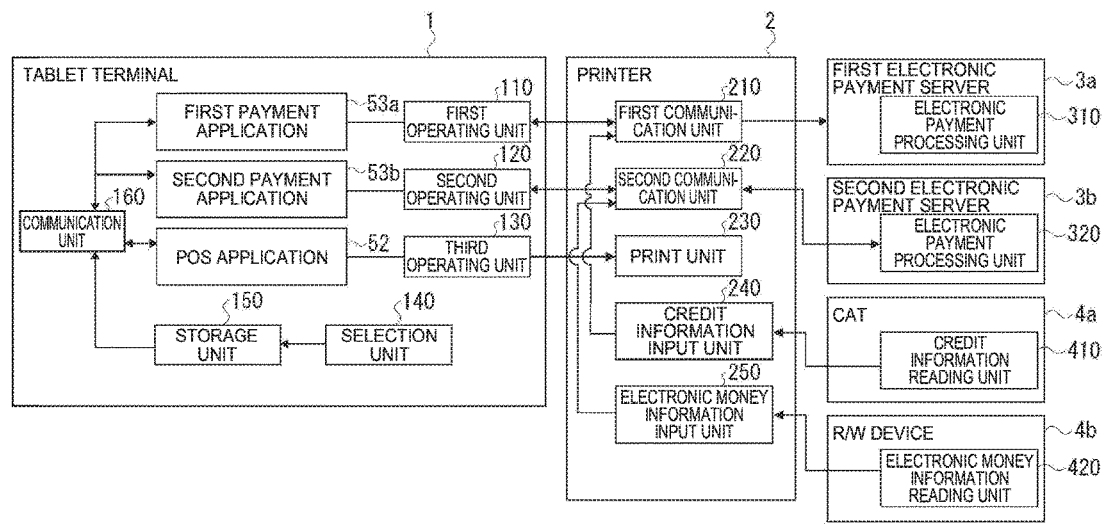
FIG. 3 is a block diagram illustrating the functional configuration of a POS system according to the first embodiment of the invention.

The functional configuration of the POS system SY1 is described next with reference to FIG. 3. The main functional components of the tablet terminal 1 are a first operating unit 110, second operating unit 120, third operating unit 130, selection unit 140, storage unit 150, and communication unit 160 (transmission unit). Note that the operating unit in this embodiment of the invention includes the first operating unit 110, second operating unit 120, and third operating unit 130.

The first operating unit 110 runs the first payment application 53a and communicates with the first electronic payment server 3a through the printer 2. The second operating unit 120 likewise runs the second payment application 53b, and communicates with the second electronic payment server 3b through the printer 2. The third operating unit 130 runs the POS application 52 and sends print commands for printing transaction receipts to the printer 2.

Operation switches between the first operating unit 110, second operating unit 120, and third operating unit 130 so that the plural applications 52, 53a, and 53b do not run at the same time. For example, when electronic payment is selected as the payment method during the transaction process of the POS application 52, the appropriate payment application 53, that is, the first payment application 53a or the second payment application 53b, is started and the POS application 52 stops (aborts or enters a sleep mode). When the POS application 52 is called from the payment application 53 and the result of the payment process is reported, the payment application 53 stops (aborts or enters a sleep mode).

The selection unit 140 is embodied by the touch panel 12, and is used to select the payment method. In this embodiment of the invention, cash payment, credit card payment, or electronic money payment can be selected as desired by the customer.

The storage unit 150 stores a first address indicating where the first payment application 53a is stored, and a second address indicating where the second payment application 53b is stored. Note that the storage unit 150 is a rewritable, nonvolatile storage medium in this example.

The communication unit 160 sends the transaction process result from the POS application 52 run by the third operating unit 130 to the first address (first payment application 53a) or the second address (second payment application 53b) according to the payment method selected through the selection unit 140. Based on the payment execution result reported by the electronic payment server 3 to the payment application 53, the communication unit 160 returns the payment process result of the complete payment process to the POS application 52.

The main functional components of the printer 2 include a first communication unit 210, second communication unit 220, print unit 230, credit information input unit 240, and electronic money information input unit 250.

The first communication unit 210 sends the transaction process result the first payment application 53a received, and the input result from the credit information input unit 240, to the first electronic payment server 3a, and sends the payment execution result of the first electronic payment server 3a to the first payment application 53a. The second communication unit 220 sends the transaction process result the second payment application 53b received, and the input result of the electronic money information input unit 250, to the second electronic payment server 3b, and sends the payment execution result from the second electronic payment server 3b to the second payment application 53b.

The print unit 230 prints based on print commands output by the POS application 52. The credit information input unit 240 inputs data (credit information) read by the CAT 4a. The electronic money information input unit 250 inputs data (electronic money information) read by the R/W device 4b.

The main functional part of the first electronic payment server 3a is an electronic payment processing unit 310. The electronic payment processing unit 310 runs processes related to electronic payments by credit card. Similarly, the main functional part of the second electronic payment server 3b is an electronic payment processing unit 320. This electronic payment processing unit 320 runs processes related to electronic payments by electronic money.

The main functional part of the CAT 4a is a credit information reading unit 410. The credit information reading unit 410 reads credit information by a magnetic reader. The main functional part of the R/W device 4b is an electronic money information reading unit 420. The electronic money information reading unit 420 reads electronic money information by near-field communication.

A screen presented on the touch panel 12 of the tablet terminal 1 is described next with reference to FIG. 4. In the figure, reference numerals D1 and D4 indicate display screens presented by the POS application 52, and reference numerals D2 and D3 indicate display screens presented by the first payment application 53a (in this example, payment by credit card is selected as the payment method). The screen transition of the touch panel 12 during the transaction process is described below.

As indicated by reference numeral D1, the POS application 52 presents a screen for selecting the payment method when input of product information to the tablet terminal 1 is completed. If the customer pays by cash, the transaction process of the POS application 52 is ended by a specific operation of the clerk (such as opening the cash drawer) without starting the payment application 53. Pressing the Credit button 71 or the Electronic Money button 72 to select the payment method starts the payment application 53 and stops the POS application 52. The Credit button 71 in the screen indicated by reference numeral D1 is selected in this example. Note that the payment application 53 is started by specifying a predetermined address.

When starting the first payment application 53a, the POS application 52 sends information including the payment amount, payment method (payment by credit card), the application to return to (POS application 52), and the address of the printer 2 to the first payment application 53a, and then quits after sending this information.

Next, the first payment application 53a displays a screen as shown in reference numeral D2 based on the information received from the POS application 52. If a credit card is inserted to the CAT 4a, the first payment application 53a executes the payment process (communicates with the first electronic payment server 3a), and displays a screen as indicated by reference numeral D3. This example shows the screen presented when the payment process is successful.

When the Complete button 73 is touched in the screen indicated by reference numeral D3, the first payment application 53a specifies the address of the POS application 52, and starts the POS application 52. The first payment application 53a also sends the payment process result to the POS application 52, and then quits.

Based on the payment process result received from the first payment application 53a, the POS application 52 displays the screen indicated by reference numeral D4. While not specifically shown in the figure, the POS application 52 also sends a print command to print a transaction receipt to the printer 2.

Figure 4:
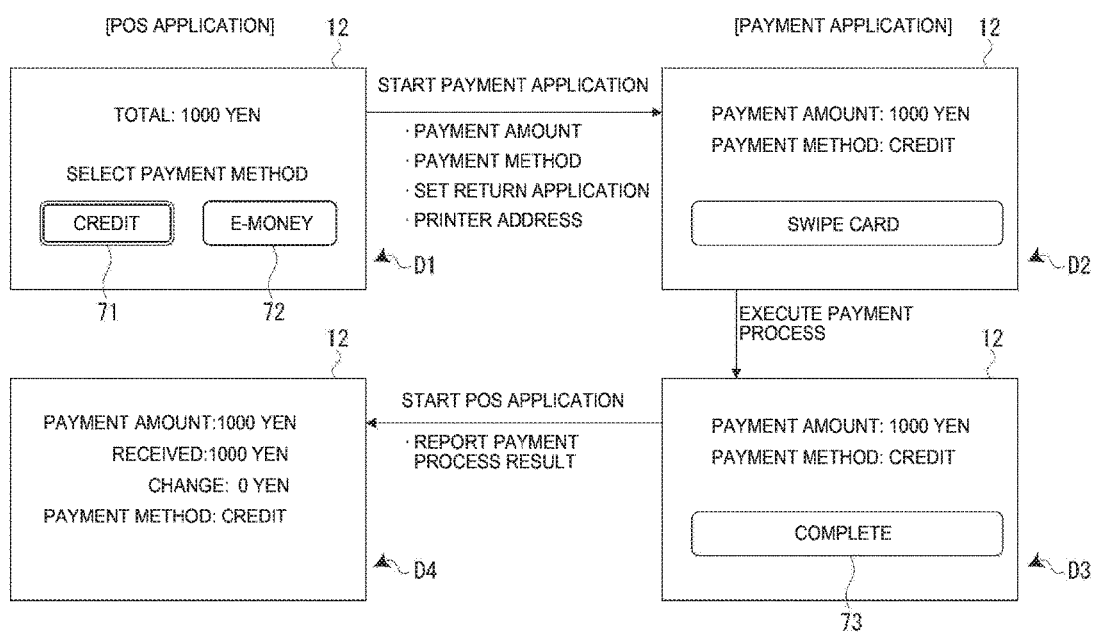
FIG. 4 shows an example of the display transition of the tablet terminal according to the first embodiment of the invention.

Note that FIG. 4 shows examples of screens presented on the tablet terminal 1, but the same screens may be displayed on the customer display 5. In this event, the customer may select and touch the buttons 71, 72, 73.

Figure 5:
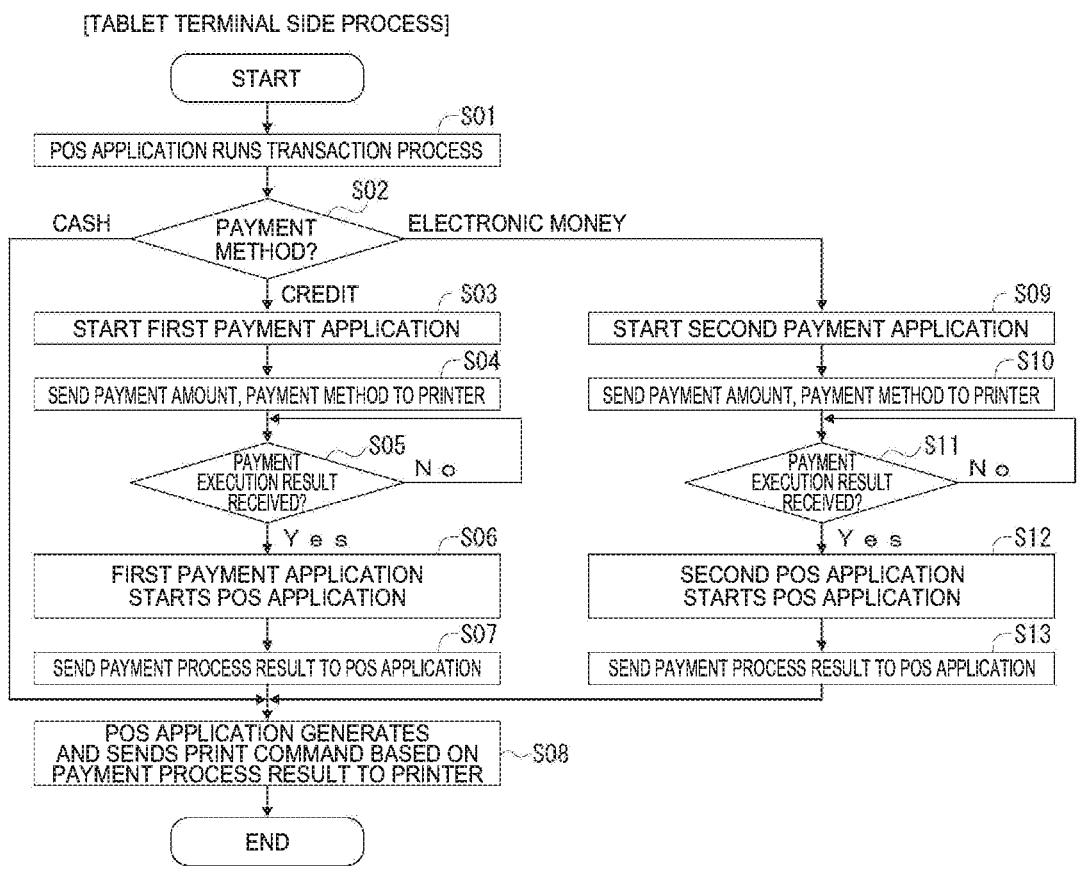
FIG. 5 is a flow chart showing the flow of a transaction process on the tablet terminal side in the first embodiment of the invention.

The flow of the transaction process in the POS system SY1 is described next with reference to the flow charts in FIG. 5 and FIG. 6. FIG. 5 is a flow chart showing the flow of the transaction process on the tablet terminal 1 side. When the tablet terminal 1 starts the transaction process of the POS application 52 (S01), it determines the payment method (S02). If the payment method is cash (S02: cash), control goes to S08.

If the payment method is by credit card (S02: credit card), the first payment application 53a starts (S03), information identifying the payment amount and payment method (payment by credit card) is sent to the first payment application 53a (S04). When the payment execution result is received from the first electronic payment server 3a through the printer 2 (S05: Yes), the POS application 52 is started by the first payment application 53a (S06), and the payment process result based on the received payment execution result is sent to the POS application 52 (S07). The POS application 52 generates and sends a print command based on the payment process result from the first payment application 53a to the printer 2 (S08).

If the payment method is by electronic money (S02: electronic money), the tablet terminal 1 starts the second payment application 53b (S09), and sends information indicating the payment amount and payment method (electronic money payment) from the second payment application 53b to the printer 2 (S10). When the payment execution result from the second electronic payment server 3b is then received through the printer 2 (S11: Yes), the POS application 52 is started by the second payment application 53b (S12), and the payment process result based on the received payment execution result is sent to the POS application 52 (S13). The POS application 52 then generates and sends a print command based on the payment process result received from the second payment application 53b to the printer 2 (S08).

Figure 6:
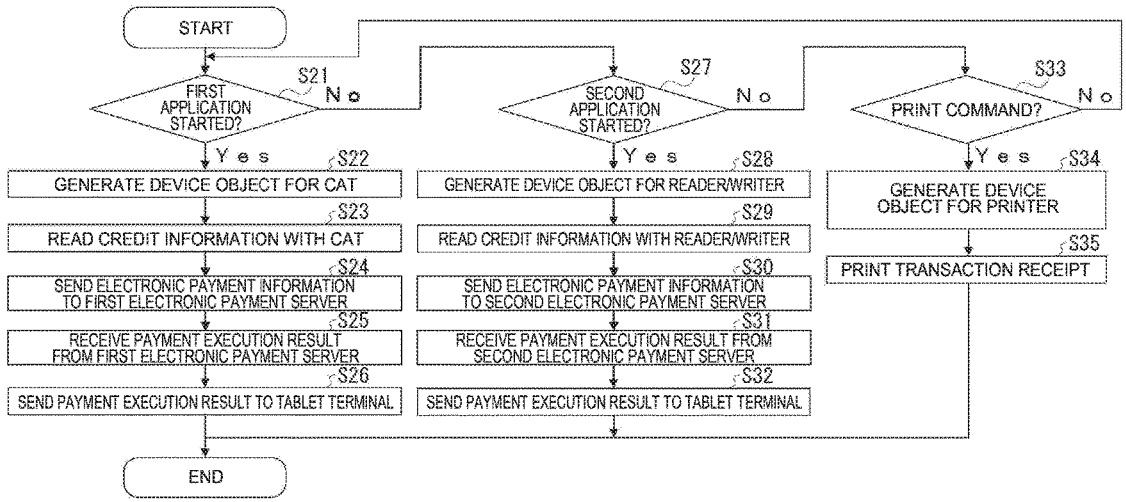
FIG. 6 is a flow chart showing the flow of a transaction process on the printer/device side in the first embodiment of the invention.

FIG. 6 is a flowchart showing the flow of the transaction process on the printer/device side, including the printer 2 and card reader 4 (CAT 4a and R/W device 4b). When the first payment application 53a is started by the tablet terminal 1 (S21: Yes), the ePOS device 61 of the printer 2 instantiates a device object for the CAT 4a (S22).

When the device object of the CAT 4a is instantiated by the printer 2, the CAT 4a can be used and reads credit information from the credit card inserted to the CAT 4a (S23). The printer 2 then sends electronic payment information including the credit information and payment amount to the first electronic payment server 3a (S24), and receives the payment execution result from the first electronic payment server 3a (S25). The printer 2 also sends the received payment execution result to the tablet terminal 1 (S26).

When the second payment application 53b is started on the tablet terminal 1 (S27: Yes), the ePOS device 61 of the 6 printer 2 instantiates a device object for the R/W device 4b (S28). When electronic money information is then read from electronic money media by the R/W device 4b (S29), the printer 2 sends electronic payment information including the electronic money information and payment amount to the second electronic payment server 3b (S30). However, when the payment execution result is received from the second electronic payment server 3b (S31), the printer 2 sends the payment execution result to the tablet terminal 1 (S32).

When a print command is sent from the tablet terminal 1 (print unit 32) (S33: Yes), the ePOS device 61 of the printer 2 instantiates a device object for the print unit 22 (S34), and prints a transaction receipt (S35).

Note that, the printer 2 may monitor the state of the application running on the tablet terminal 1 and decide in S21 and S27 by detecting that the payment application 53a, 53b has started, or when the payment application 53a, 53b starts, the application may send a start signal to the printer 2.

As described above, because the tablet terminal 1 according to the first embodiment of the invention has a payment application 53 for processing electronic payments in addition to the POS application 52, there is no need to greatly modify the POS application 52 to add an electronic payment function. As a result, an electronic payment function can be added at a low cost. Modification of the POS application 52 in the first embodiment of the invention requires simply adding a Credit button 71 and a Electronic money button 72 (see FIG. 4) to the payment screen, and adding functions for starting the payment applications 53a, 53b appropriately to which button is operated.

The tablet terminal 1 according to the first embodiment of the invention has two types of payment applications 53a, 53b as the payment application 53, and can therefore handle two types of electronic payment processes. As a result, an electronic payment service provider can be added or changed without greatly modifying the POS application 52 by simply adding or changing a storage unit 150 and payment application 53.

Furthermore, because the printer 2 is between the card reader 4 and the tablet terminal 1 in the POS system SY1 according to the first embodiment of the invention, communication is possible even if the tablet terminal 1 cannot connect directly to the card reader 4. In addition, because the tablet terminal 1 and the printer 2 connect through a wireless communication link, the portability of the tablet terminal 1 is not impaired.

Furthermore, because an electronic payment server 3, card reader 4, and peripheral devices 5, 6, 7 connect to the printer 2 and exchange information with the printer 2, the processor load on the tablet terminal 1 can be reduced. Yet further, because the tablet terminal 1 switches operation between the POS application 52 and the payment applications 53a, 53b, even terminal devices that cannot run multiple applications simultaneously can be used as the tablet terminal 1 of the first embodiment.

Furthermore, because a print command is sent to the printer 2 triggered by a payment completion report from the electronic payment server 3a, 3b to the payment applications 53a, 53b, a transaction receipt can be printed without requiring an explicit print receipt operation by the checkout clerk.

Variations of Embodiment 1

The first embodiment of the invention described above describes a configuration having payment applications 53a, 53b for electronic payments, but may also be configured with payment applications compatible with payment methods other than electronic payments. Examples of such applications include a pay-with-points application for paying with reward points, and a check payment application for paying with a check. Note that in the case of a check payment, the server desirably executes a check authentication process and completes payment when authentication is verified.

The first embodiment of the invention describes a configuration having two types of payment applications 53a, 53b, but is not so limited and may be configured with three or more payment applications (such as a pay-with-points application or a check payment application). In this case, three or more addresses corresponding to the three or more payment applications are stored in the storage unit 150.

Note that the control device of the invention is embodied by the printer 2 in this example, but the control device may also be embodied by a relay device that can connect to the printer 2 or by an interface board that is removably installable to the printer 2. In these cases, the printer control mechanism 21 and interfaces 23, 24, 25 shown in FIG. 1, the ePOS device 61 and electronic payment control module 62 shown in FIG. 2, and the first communication unit 210, second communication unit 220, credit information input unit 240, and electronic money information input unit 250 shown in FIG. 3 are disposed to the relay device or to the interface board.

An example of a configuration in which the first payment application 53a is compatible with credit card payments, and the second payment application 53b is compatible with electronic money pays, is described in the first embodiment, but a configuration in which the first payment application 53a is compatible with a first credit connection intermediary and a first electronic money connection intermediary, and the second payment application 53b is compatible with a second credit connection intermediary and a second electronic money connection intermediary, is also conceivable. In this case, the selection unit 140 may select the connection intermediary.

Further alternatively, the selection unit 140 may select the payment method (payment by credit card or electronic money payment), and determine the connection intermediary appropriately to the card read by the card reader 4. In this case, the POS application 52 starts one payment application 53 appropriately to the selection of the electronic payment. As a result, the CAT 4a and R/W device 4b can be used and the card information read. The printer 2 sends the credit information to the tablet terminal 1 (POS application 52). The POS application 52 then starts the payment application 53 appropriate to the credit information, and then executes the processes shown in FIG. 5 and FIG. 6.

The tablet terminal 1 is controlled using a native application in the foregoing embodiment, but may alternatively be controlled by a web application. In this event, the POS application 52 and payment applications 53a, 53b are run by a server over the Internet, and the operating system 51 is not necessary.

In addition, print commands are generated and sent to the printer 2 by the POS application 52, but print commands may be generated and sent to the printer 2 by the payment applications 53a, 53b. Further alternatively, the payment applications 53a, 53b may acquire the print commands generated by the POS application 52, and the payment applications 53a, 53b may send the acquired commands to the printer 2.

Component elements of the POS system SY1 described above can also be provided as programs. The programs can also be provided stored on a suitable storage medium (such as CD-ROM, flash memory). More specifically, a program that causes a computer to function as the components of the POS system SY1, and a recording medium storing the program, are included in the scope of the invention.

The terminal of the invention is applied to a tablet terminal 1 in the first embodiment of the invention, but may also be applied to other types of information processing terminals. The control device of the invention is applied to a printer 2, but may also be applied to POS terminal peripheral devices other than a printer 2 (such as the customer display 5). The device of the invention is applied to a card reader 4, such as the CAT 4a or R/W device 4b, but may also be applied to a reader that reads membership cards or a scanner that reads checks. Other variations are also possible without departing from the scope of the invention.

Embodiment 2

Figure 7:
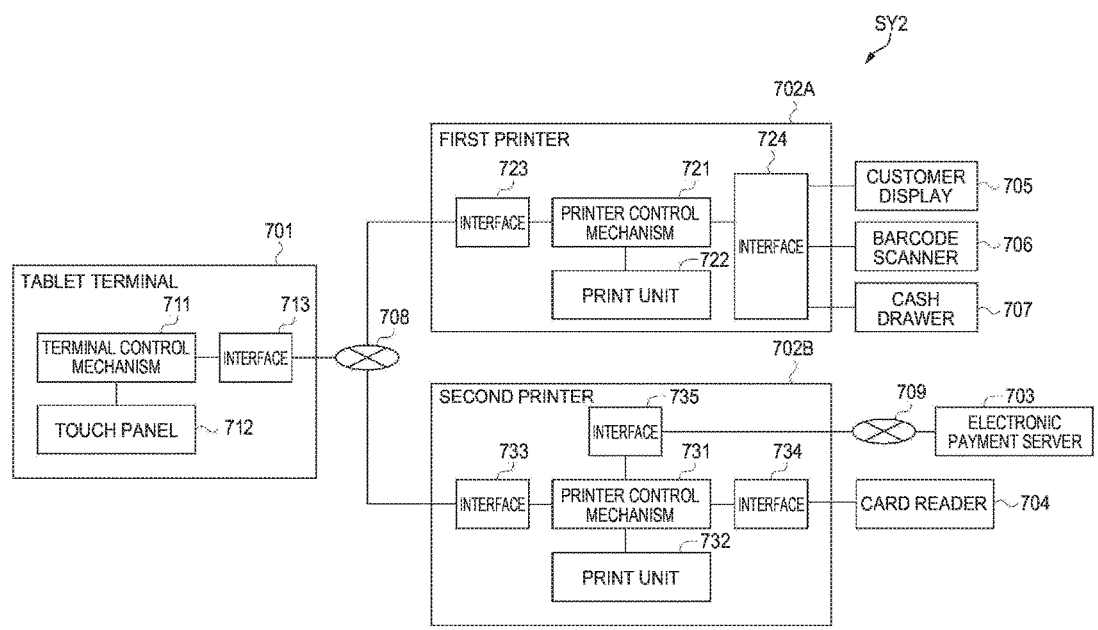
FIG. 7 is a system configuration diagram of a POS system according to a second embodiment of the invention.

A data communication system as an example of a POS system, and a control method of a data communication system, according to a second embodiment of the invention are described below with reference to the accompanying figures. This second embodiment of the invention describes a POS system as an application of the data communication system according to the invention. FIG. 7 is a system configuration diagram of a POS system SY2. The POS system SY2 includes a tablet terminal 701 (terminal) that is operated by a store employee; a first printer 702A (first control device) and a second printer 702B (second control device) that connect to the tablet terminal 701 through an in-house LAN 708; and an electronic payment server 703 that connects to the second printer 702B through the Internet 709. The POS system SY2 also includes a customer display 705, barcode scanner 706, and cash drawer 707 connected to the first printer 702A, and a card reader 704 (device) connected to the second printer 702B. The customer display 705, barcode scanner 706, and cash drawer 707 are also collectively referred to as peripheral devices.

The tablet terminal 701 includes a terminal control mechanism 711, a touch panel 712, and an interface 713. The terminal control mechanism. 711 includes a CPU (Central Processing Unit), ROM (Read Only Memory) and RAM (Random Access Memory), and controls the tablet terminal 701.

The touch panel 712 is a touch sensor with a display function, and is used to display information such as the input product information and payment process result, and perform various operations. The interface 713 is compatible with wireless communication such as a wireless LAN, for example, is connected to the in-house LAN 708 through an access point not shown, and exchanges data through the in-house LAN 708 with the interfaces 723, 733 of the printers 702A, 702B.

The first printer 702A has a printer control mechanism 721, print unit 722, and interfaces 723, 724. The printer control mechanism 721 includes a CPU, ROM, and RAM, and controls the first printer 702A. The print unit 722 includes a printhead, paper conveyance mechanism, and paper cutter mechanism, and prints on receipt paper.

Interface 723 communicates with the tablet terminal 701 through the in-house LAN 708. Interface 724 communicates by wire or wirelessly with the peripheral devices 705, 706, 707.

The second printer 702B has interfaces 733, 734, 735 in addition to a printer control mechanism 731, and print unit 732. The printer control mechanism 731 includes a CPU, ROM, and RAM, and controls the second printer 702B. The print unit 723 includes a printhead, paper conveyance mechanism, and paper cutter mechanism, and prints on receipt paper.

Interface 733 communicates with the tablet terminal 701 through the in-house LAN 708. Interface 734 communicates by wire or wirelessly with the card reader 704. Interface 735 communicates with the electronic payment server 703 through the Internet 709.

The electronic payment server 703 processes electronic payments by credit card or electronic money. Processing an electronic payment in the case of a credit card includes receiving electronic payment information including the transaction amount and credit information (such as credit card number and expiration date); authenticating the credit card; processing security measures; settling the payment amount; and reporting the payment execution result. Processing an electronic payment in the case of electronic money includes receiving electronic payment information including the transaction amount and the electronic money information (such as electronic money ID and balance information); electronic money authentication; processing security measures; updating the balance information; and reporting the payment execution result.

The card reader 704 reads data from a credit card or electronic money (referred to below as "electronic payment media"), and outputs to the second printer 702B. More specifically, the card reader 704 is equivalent to a CAT and an electronic money reader/writer. Note that electronic money is not limited to card media, and an electronic money RFID chip embedded in a cell phone, for example, may be read.

The customer display 705 displays information (such as the product names and transaction amount) for the customer. The barcode scanner 706 reads product barcodes printed on or affixed to the products. The cash drawer 707 stores money and checks, for example, and is configured to open when the payment process is completed (when a cash payment is received).

Figure 8:
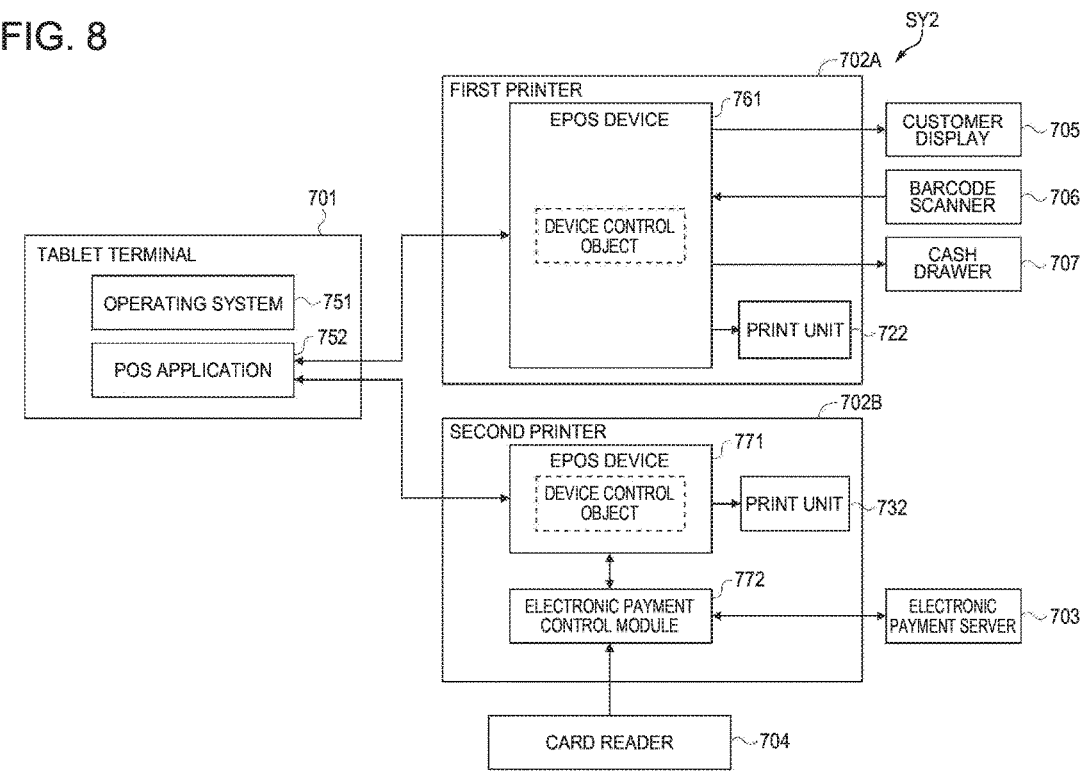
FIG. 8 is a block diagram illustrating the software configuration of a POS system according to a second embodiment of the invention.

The software configuration of the POS system SY2 is described next with reference to FIG. 8. An OS (operating system) 751, and a POS application 752 that runs on the operating system 751, are installed as software applications on the tablet terminal 701. The terminal control mechanism 11 in FIG. 1 operates according to these software objects 751, 752.

The POS application 752 is an application that runs a transaction process and a payment process using electronic payment media. A transaction process as used here includes acquiring product information (such as product barcodes and quantities), calculating the payment amount, handling cash payments, outputting transaction receipt print commands, controlling displaying information on the customer display 705, and opening the cash drawer 707. A payment process includes controlling reading electronic payment media, sending electronic payment information to the electronic payment server 703, and executing processes (including retry processes) based on the payment execution result of the electronic payment server 703.

The POS application 752 is customized by the store. Such customization may include, for example, the display format of information screens presented on the tablet terminal 701, the printing format of transaction receipts, the store logo printed on transaction receipts, and the display items presented on the customer display 705.

The printer 702 has an embedded ePOS device 761 (control device). Operation of the printer control mechanism 721 in FIG. 7 is based on the ePOS device 761.

Based on commands from the POS application 752, the ePOS device 761 instantiates device control objects for and controls the peripheral devices 705, 706, 707 and print unit 722. For example, the ePOS device 761 controls displaying product information on the customer display 705 based on display commands from the POS application 752, controls sending the results of reading by the barcode scanner 706 to the POS application 752, controls opening the drawer of the cash drawer 707 based on an open drawer command from the POS application 752, and controls operating the print unit 722 based on a print command from the POS application 752.

An ePOS device 771 and electronic payment control module 772 are embedded in the second printer 702B. Operation of the printer control mechanism 731 shown in FIG. 7 is primarily based thereon.

The ePOS device 771 instantiates device control objects for and controls the card reader 704 and print unit 732 based on commands from the POS application 752. When a start payment process command is received from the POS application 752, the ePOS device 771 sends the command to the electronic payment control module 772.

The electronic payment control module 772 is a module for controlling the card reader 704. For example, when a start payment process command is passed from the ePOS device 771, the electronic payment control module 772 enables reading by the card reader 704 and waits for data from the card reader 704. The electronic payment control module 772 is also compatible with multiple different brands of electronic payment media.

The electronic payment control module 772 also controls communicating with the electronic payment server 703. More specifically, the electronic payment control module 772 sends electronic payment information including the data read by the card reader 704 and electronic payment information including the payment amount received from the POS application 752 to the electronic payment server 703. When payment is successfully completed by the electronic payment server 703, the electronic payment control module 772 may also control turning an LED (not shown in the figure) on the card reader 704 on to signal that the card may be removed, and sending a payment completion report through the ePOS device 771 to the POS application 752.

When the electronic payment server 703 is unable to successfully complete the payment, the electronic payment control module 772 may control an LED on the card reader 704 to blink, or control the POS application 752 to display an error (on the touch panel 712) through the ePOS device 771. By thus embedding an electronic payment control module, an electronic payment service may be added or changed by simply replacing the electronic payment control module 772 (without needing to replace the printer 702 itself).

Figure 9:
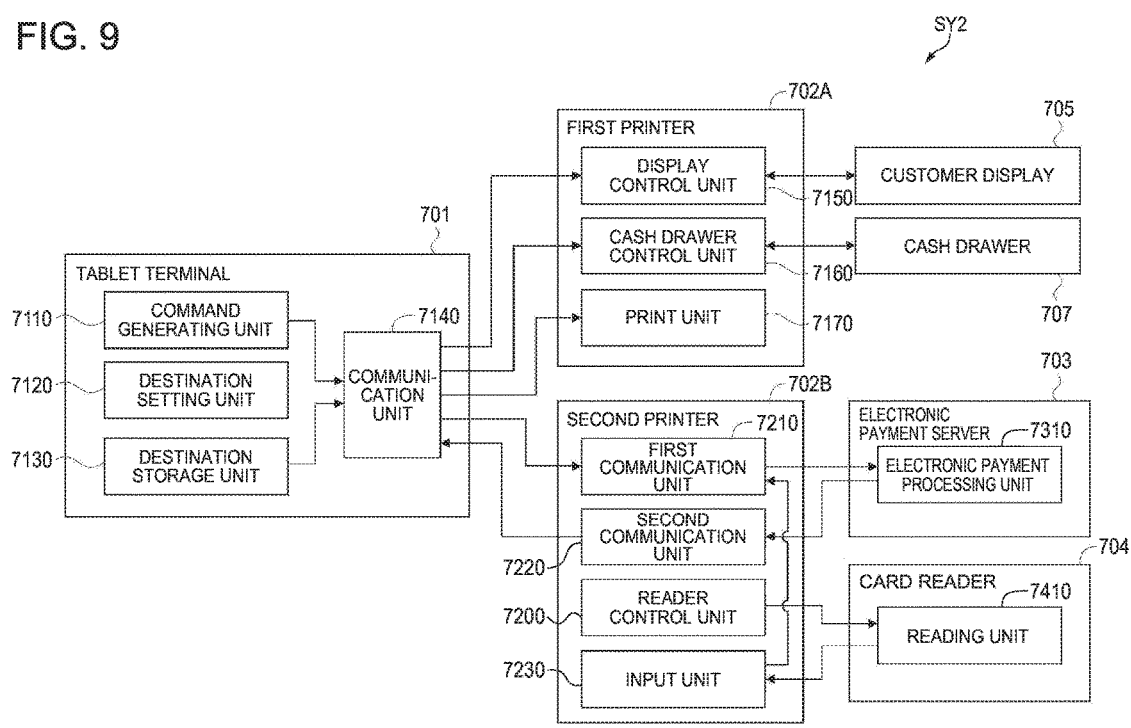
FIG. 9 is a block diagram illustrating the functional configuration of a POS system according to the second embodiment of the invention.

The functional configuration of the POS system SY2 is described next with reference to FIG. 9. The main functional components of the tablet terminal 701 are a command generating unit 7110, destination setting unit (setting unit) 7120, destination storage unit (storage unit) 7130, and communication unit 7140.

The command generating unit 7110 is embodied by the POS application 752, and generates commands that the tablet terminal 701 sends to the printers 702A, 702B. More specifically, the command generating unit 7110 generates print commands for printing transaction receipts, display commands for displaying the payment process result, open commands for opening the cash drawer 707, start payment process commands for enabling the card reader 704 to read electronic payment media, and send electronic payment information commands for sending electronic payment information to the electronic payment server 703. The payment amount and payment method are included in the send electronic payment information command. The print command and display command are generated based on a cash payment process result if payment is by cash, and based on the payment process result based on the payment execution result of the electronic payment received from the second printer 702B in the event of an electronic payment (payment by credit card or electronic money payment).

The destination setting unit 7120 sets the command destination to the first printer 702A or second printer 702B. The destination storage unit 7130 stores the destination set for each command by the destination setting unit 7120. In this example, the destination of print commands, display commands, and open drawer commands is previously set by the destination setting unit 7120 to the first printer 702A, the destination of start payment process commands and send electronic payment information commands is set to the second printer 702B, and the destinations are stored in the destination storage unit 7130.

The communication unit 7140 references the destination storage unit 7130 and sends the commands generated by the command generating unit 7110 to the destinations set (determined) by the destination setting unit 7120.

The main functional parts of the first printer 702A are a display control unit 7150, cash drawer control unit 7160, and print unit 7170. The display control unit 7150 controls the customer display 705 based on the display commands, and displays information on the customer display 705.

The cash drawer control unit 7160 controls the cash drawer 707 based on the cash drawer commands, and causes the cash drawer 707 to open. The print unit 7170 prints based on the print commands.

The main functional parts of the second printer 702B are a first communication unit 7210, second communication unit 7220, reader control unit 7200 and input unit 7230. Based on a send electronic payment information command, the payment amount and the input result of the input unit 7230 contained in the command are sent by the first communication unit 7210 to the electronic payment server 703. Based thereon, the electronic payment server 703 then executes a payment transaction. The second communication unit 7220 sends the process result of the electronic payment server 703 to the tablet terminal 701.

The reader control unit 7200 controls the card reader 704 based on the start payment process command, and enables the card reader 704 to read. Data read by the card reader 704 is input to the input unit 7230.

The main functional part of the electronic payment server 703 is the electronic payment processing unit 7310. The electronic payment processing unit 7310 processes electronic payments as described above. The main functional part of the card reader 704 is the reading unit 7410. The reading unit 7410 reads data from electronic payment media by near-field communication. More specifically, the reading unit 7410 reads credit information from credit cards, and electronic money information from electronic money media.

Figure 10:
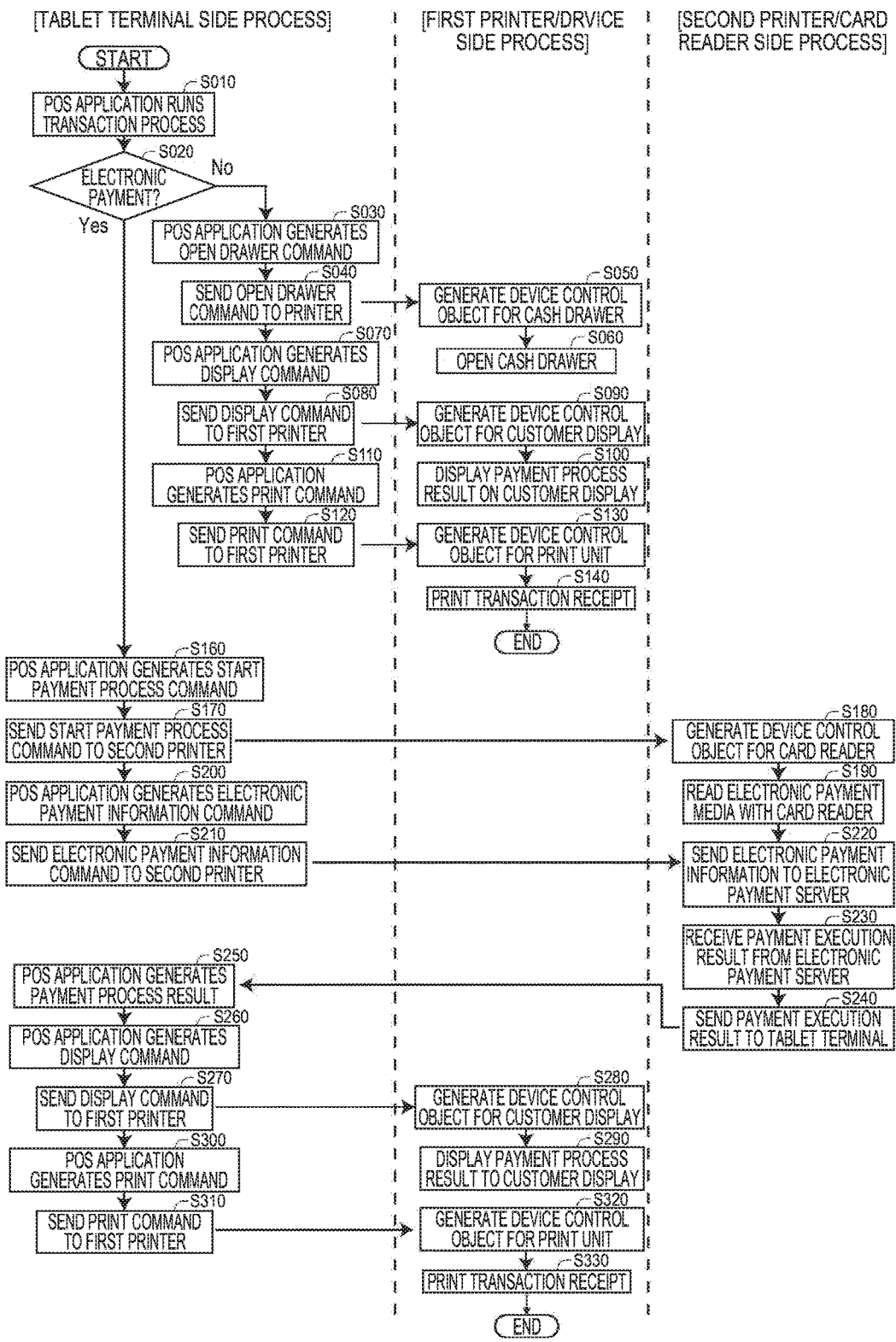
FIG. 10 is a flow chart showing the flow of a transaction process in a POS system according to the second embodiment of the invention.

The flow of a transaction process executed by the POS system SY2 is described next with reference to the flow chart in FIG. 10. When the POS application 752 executes a transaction process (S010), the tablet terminal 701 determines if the payment method is an electronic payment (credit or electronic money) (S020).

If the payment method is not an electronic payment (if payment is by cash) (S020: No), the POS application 752 generates an open drawer command for the cash drawer 707 (S030), and sends the generated open drawer command to the first printer 702A (S040). When an open drawer command is received, the ePOS device 761 of the first printer 702A instantiates a device control object for the cash drawer 707 (S050), and opens the cash drawer 707 (S060). A cash payment is then completed.

The POS application 752 then generates a display command based on the payment process result of the cash payment (S070), and sends the generated display command to the first printer 702A (S080). When the display command is received, the ePOS device 761 of the first printer 702A instantiates a device control object for the customer display 705 (S090), and displays the payment process result on the customer display 705 (S100).

Next, the POS application 752 generates a print command based on the payment process result of the cash payment (S110), and sends the generated print command to the first printer 702A (S120). When the print command is received, the ePOS device 761 of the first printer 702A instantiates a device control object for the 722 (S130), and prints a transaction receipt (S140). The transaction process thus ends.

Returning to S2, if the payment method is an electronic payment (S020: Yes), the POS application 752 generates a start payment process command (S160), and sends the generated start payment process command to the second printer 702B (S170). When the start payment process command is received, the ePOS device 771 of the second printer 702B instantiates a device control object for the card reader 704 (S180). When a device control object for the card reader 704 is instantiated by the second printer 702B, the card reader 704 can be used and electronic payment media can be read (S190).

The POS application 752 also generates a send electronic payment information command including the payment amount and payment method (S200), and sends the generated send electronic payment information command to the second printer 702B (S210). The second printer 702B receives the send electronic payment information command and sends electronic payment information including the result of reading the electronic payment media and the payment amount to the electronic payment server 703 appropriate to the payment method (S220), and receives the payment execution result (payment OK or payment rejected) from the electronic payment server 703 (S230). The second printer 702B also sends the received payment execution result to the tablet terminal 701 (S240).

The POS application 752 generates a payment process result based on the payment execution result received from the electronic payment server 703 (S250). Next, the POS application 752 generates a display command based on the generated payment process result (S260), and sends the generated display command to the first printer 702A (S270), and when the first printer 702A receives the display command, the ePOS device 761 instantiates a device control object for the customer display 705 (S280), and displays the payment process result on the customer display 705 (S290).

Based on the generated payment process result, the POS application 752 also generates a print command (S300), and sends the generated print command to the first printer 702A (S310). When the first printer 702A receives the print command, the ePOS device 761 instantiates a device control object for the print unit 722 (S320), and prints a transaction receipt (S330). This completes the transaction process.

As described above, by previously setting the destination for each command to the first printer 702A or second printer 702B in this second embodiment of the invention, the destination does not need to be specified each time a command is generated, and commands can be sent to the printer 702A, 702B appropriate to the content (function) of the command. As a result, devices (including the card reader 704 connected to the second printer 702B) connected to two or more control devices can be used by a single terminal without greatly modifying the POS application 752.

When plural tablet terminals 701 are used, this second embodiment enables the plural tablet terminals 701 to share the electronic payment transaction function of the second printer 702B. As a result, this embodiment can be desirably used in situations in which an electronic payment function is not used frequently, and the electronic payment function is enabled in only one of plural printers.

Note that the second embodiment may also be configured so that the command destinations set by the destination setting unit 7120 can be set by the user through the tablet terminal 701, or the tablet terminal 701 may acquire information about the peripheral devices (devices) connected to the printers 702A, 702B and the destinations set based on the acquired information.

The control device of the invention is applied to the printers 702A, 702B in this second embodiment of the invention, but may also be embodied by a relay device that can connect to the printers 702A, 702B or an interface board that can be removably installed to the printers 702A, 702B. In this case, the printer control mechanisms 721, 731 and interface 723, 724, 733, 734, 735 shown in FIG. 7, the ePOS devices 761, 771 and electronic payment control module 772 shown in FIG. 8, and the display control unit 7150, cash drawer control unit 7160, first communication unit 7210, second communication unit 7220, reader control unit 7200 and input unit 7230 shown in FIG. 9 are disposed to the relay device or the interface board.

The tablet terminal 701 is controlled using a native application in the second embodiment, but may alternatively be controlled by a web application. In this event, the POS application 752 is run by a server over the Internet, and the operating system 751 is not necessary.

Component elements of the POS system SY2 described in this example can also be provided as programs. The programs can also be provided stored on a suitable storage medium (such as CD-ROM, flash memory). More specifically, a program that causes a computer to function as the components of the POS system SY2, and a recording medium storing the program, are included in the scope of the accompanying claims.

The terminal of the invention is applied to a tablet terminal 701 in the second embodiment, but may also be applied to other types of information processing terminals. The control device of the invention is applied to a printer 702A, 702B, but may also be applied to POS terminal peripheral devices other than a printer 702 (such as the customer display 705). Other variations are also possible without departing from the scope of the invention.

As described above, the invention is useful for adding and changing a payment function including an electronic payment function in a POS system without greatly changing the POS application, and for adding a payment function such as an electronic payment function to a POS system at a low cost.

REFERENCE SIGNS LIST

1 tablet terminal
2 printer
3*a* first electronic payment server
3*b* second electronic payment server
4*a* CAT 4b R/W
5 customer display
6 barcode scanner
7 cash drawer
11 terminal control mechanism
12 touch panel
21 printer control mechanism
22 print unit
51 OS
52 POS application
53a first payment application
53b second payment application
61 ePOS device
62 electronic payment control module
110 first operating unit
120 second operating unit
130 third operating unit
140 selection unit
150 storage unit
160 communication unit
210 first communication unit
220 second communication unit
230 print unit
NW network
SY1 POS system
701 tablet terminal
702A first printer
702B second printer
704 card reader
7110 command generating unit
7120 destination setting unit
7130 destination storage unit
7140 communication unit
7170 print unit
SY2 POS system

The invention claimed is:

1. A POS terminal comprising:
a storage medium storing a POS application and a first application, the first application being stored at a first address of the storage medium; and
a CPU configured to run the POS application, and the first application, the POS application being configured to execute a transaction process, and the first application being configured to execute a first payment process that corresponds to the transaction process,
wherein after a transaction process is executed by the POS application, the CPU sends a result of the transaction process of the POS application to the first application identified by the first address,
wherein after the result of the transaction process is received by the first application, the POS application stops, and the first application identified by the first address starts,
wherein after the first payment process is executed by the first application, the CPU sends information based on the first payment process to a printer and receives a result of the first payment process from the printer, and the CPU sends the result of the first payment process received from the printer to the POS application, and
wherein after the result of the first payment process is received by the POS application, the first application stops, the POS application restarts to resume the transaction process, the POS application generates and sends a print command based on the result of the first payment process to the printer, and the POS application includes the result of the first payment process in the transaction process and reports an updated result of the transaction process including the result of the first payment process.

2. The POS terminal described in claim 1, wherein:
the CPU runs a second application that is located at a second address and executes a second payment process different from the first application;
the storage medium stores the second address; and
the CPU sends the transaction process result of the POS application to the first application identified by the first address or the second application identified by the second address.

3. The POS terminal described in claim 2, wherein:
the first application and the second application execute a payment process related to an electronic payment;
the first application sends data to a first electronic payment server; and
the second application sends data to a second electronic payment server.

4. The POS terminal described in claim 2, further comprising:
the CPU configured to select the first payment process or the second payment process, and
send a payment result of the POS application to the first application identified by the first address or the second application identified by the second address according to a selection result.

5. The POS terminal described in claim 2, wherein:
the first payment process executed by the first application is a payment process using a credit card; and
the second payment process executed by the second application is a payment process using electronic money.

6. A POS system comprising:
a storage medium storing a POS application and a first application, the first application being stored at a first address of the storage medium;
a POS terminal including a CPU configured to run the POS application and the first application, the POS application being configured to execute a transaction process, and the first application being configured to execute a first payment process that corresponds to the transaction process; and
a device configured to read information;
a printer that connects to the device and the POS terminal; and
a first electronic payment server configured to connect to the printer, and receive data based on the first payment process of the first application through the printer,
wherein after a transaction process is executed by the POS application, the CPU in the POS terminal sends a result of the transaction process of the POS application to the first application identified by the first address,
wherein after the result of the transaction process is received by the first application, the POS application stops, and the first application identified by the first address starts,
wherein after the first payment process is executed by the first application, the CPU sends information based on the first payment process to a printer and receives a result of the first payment process from the printer, and the CPU sends the result of the first payment process received from the printer to the POS application, and
wherein after the result of the first payment process is received by the POS application, the first application stops, the POS application restarts to resume the transaction process, the POS application generates and sends a print command based on the result of the first payment process to the printer, and the POS application includes the result of the first payment process in the transaction process and reports an updated result of the transaction process including the result of the first payment process.

7. The POS system described in claim 6, wherein:

the CPU runs a second application that is located at a second address and executes a second payment process different from the first application;

the storage medium stores the second address;

the CPU sends the payment result of the POS application run by the CPU to the first application identified by the first address or the second application identified by the second address; and a second electronic payment server connects to the printer, and receives data based on the second payment process of the second application through the printer.

8. A control method of a POS terminal, the POS terminal comprising a storage medium storing a POS application and a first application, the first application being stored at a first address of the storage medium, the POS application being configured to execute a transaction process, and the first application being configured to execute a first payment process that corresponds to the transaction process, comprising:

running the POS application that executes a transaction process;

sending a result of transaction process of the POS application to a first application stored at a first address of a storage medium; and the first application executing a first payment process when the transaction process result of the POS application is sent to the first application identified by the first address, wherein after the result of the transaction process is received by the first application, the POS application stops, and the first application identified by the first address starts, and wherein after the first payment process is executed by the first application, the CPU sends information based on the first payment process to a printer and receives a result of the first payment process from the printer, and the CPU sends the result of the first payment process received from the printer to the POS application, and wherein after the result of the first payment process is received by the POS application, the first application stops, the POS application restarts to resume the transaction process, and the POS application restarts to resume the transaction process, the POS application generates and sends a print command based on the result of the first payment process to the printer, and the POS application includes the result of the first payment process including the result of the first payment process.

9. The control method of a POS terminal described in claim 8, further comprising:

sending the transaction process result of the POS application to a second application identified by second address where a second application is located; and the second application executing a second payment process when the transaction process result of the POS application is sent to the second application identified by the second address.

* * * * *